United States Patent [19]

Cole et al.

[11] Patent Number: 5,230,956
[45] Date of Patent: Jul. 27, 1993

[54] POLYAMIDE-IMIDE SIZED FIBERS

[75] Inventors: Bill W. Cole, Naperville, Ill.; Robert B. Hanson, Augusta, Ga.; Gary T. Brooke, Naperville, Ill.

[73] Assignee: Amoco Corporation, Chicago, Ill.

[21] Appl. No.: 626,246

[22] Filed: Dec. 12, 1990

Related U.S. Application Data

[63] Continuation of Ser. No. 322,195, Mar. 13, 1989, abandoned, which is a continuation of Ser. No. 905,759, Sep. 9, 1986, abandoned, which is a continuation-in-part of Ser. No. 642,523, Aug. 20, 1984, abandoned, and a continuation-in-part of Ser. No. 759,421, Jul. 26, 1985, Pat. No. 4,640,944, which is a continuation of Ser. No. 576,137, Jan. 31, 1984, abandoned, and a continuation-in-part of Ser. No. 383,268, May 28, 1982, Pat. No. 4,467,011.

[51] Int. Cl.$^5$ .......................... B32B 9/00; D02G 3/00
[52] U.S. Cl. .................................... 428/367; 428/375; 428/359; 428/361; 428/368; 428/395; 428/392; 428/408

[58] Field of Search ............... 428/367, 368, 375, 392, 428/395, 408, 473.5

[56] References Cited

U.S. PATENT DOCUMENTS

| | | | |
|---|---|---|---|
| 4,107,128 | 8/1978 | Hosoi et al. | 523/434 |
| 4,313,868 | 2/1982 | Hanson | 524/600 |
| 4,442,254 | 4/1984 | Aratani | 524/413 |
| 4,451,528 | 5/1984 | Krause | 428/285 |
| 4,467,011 | 8/1984 | Brooks | 428/245 |
| 4,579,773 | 4/1986 | Cole et al. | 428/260 |
| 4,640,944 | 2/1987 | Brooks | 523/205 |
| 4,684,674 | 8/1987 | Brooks | 523/205 |

Primary Examiner—Patrick J. Ryan
Assistant Examiner—J. M. Gray
Attorney, Agent, or Firm—Richard J. Schlott; Stephen L. Hensley; Frank J. Sroka

[57] ABSTRACT

The present invention is directed to fibers which are sized or coated on the surface with a polyamide-amic acid, an amide-imide polymer, an amide-imide copolymer or mixtures of these materials and to composites prepared from the sized fibers.

9 Claims, No Drawings

POLYAMIDE-IMIDE SIZED FIBERS

This Application is a continuation of prior application Ser. No. 07/322,195, filed Mar. 13, 1989, now abandoned; which was a continuation of application Ser. No. 06/905,759, filed Sep. 9, 1986, now abandoned; which was a continuation-in-part of application Ser. No. 06/642,523, filed Aug. 20, 1984, now abandoned; and a continuation-in-part of application Ser. No. 06/759,421, filed Jul. 26, 1985, now U.S. Pat. No. 4,640,944, which was a continuation of application Ser. No. 06/576,137, filed Jan. 31, 1984, now abandoned; and a continuation-in-part of application Ser. No. 06/383,268, filed May 28, 1982, now U.S. Pat. No. 4,467,011.

BACKGROUND OF THE INVENTION

This invention relates to sized fibers for use as reinforcement in composites, and more particularly to reinforcing fibers coated on the surface with a sizing composition comprising polyamide-amic acid, amide-imide polymer, amide-imide copolymer, amide-imide phthalamide copolymer or mixtures of these materials (hereinafter collectively referred to as amide-imide polymers) and to composites prepared from these sized fibers. The sized fibers may be used to prepare composites with amide-imide polymers as the matrix resin having excellent toughness properties and enhanced thermal properties for extended use at temperatures in excess of 450° F.

Carbon fiber composites wherein carbon fibers are included in a synthetic resin matrix are well known in the art as is the use of other reinforcing fibers. The function of the resin matrix is primarily to give the composite the required external dimension and shape, while the reinforcing fibers provide the composite with the required strength and stiffness.

Improved bonding between, for example, carbon fibers and matrix resins in general has been accomplished in the past by a number of techniques such as by plating the carbon fibers with various metals including tantalum, metal carbides and nitrates, and by etching the surface of the carbon fibers with oxidizing agents such as air, ozone, concentrated nitric acid and chromic-sulfuric acid. Block and graft copolymers have also been used to improve bonding between the carbon fibers and the matrix as illustrated by U.S. Pat. No. 3,855,174. Carbon fibers have also been coated with a variety of sizing agents such as epoxy resins for a number of reasons, such as to prevent snagging and fraying of the carbon fibers as illustrated by U.S. Pat. Nos. 3,373,984; 3,806,489; 3,908,042; 3,914,504; 3,953,641; 3,971,669; and 4,145,472, and British Patent Specification No. 1,195,219. U.S. Pat. No. 4,364,993 uses a polyisocyanate or a sorbitol polyglycidyl ether as sizing agents for carbon fibers.

Amide-imide polymers and copolymers are a relatively new class of organic compounds known for their solubility in nitrogen-containing organic solvents when in the largely polyamide form. In the past, the major application of these amide-imide polymers has been as wire enamels. This is illustrated in U.S. Pat. Nos. 3,661,832 (1972), 3,494,890 (1970) and 3,347,828 (1967). Amide-imide polymers and copolymers have also been found useful for molding applications as shown in U.S. Pat. Nos. 4,016,140 (1977) and 3,573,260 (1971). U.S. Pat. Nos. 4,136,085 (1979), 4,313,868 (1982), and 4,309,528 (1982) are incorporated herein by reference. These polyamide-imides are known for their outstanding mechanical properties. Filled polyamide-imide resins and composites are also known in the art. The agents commonly used for sizing fibers and fillers tend to volatilize or decompose at the very high temperatures used to process amide-imide matrix resins, forming volatiles which cause voids in the final composite structure. Additionally, most of these sizing agents do not provide acceptable binding between the fiber and the amide-imide polymer matrix. More recently, in U.S. Pat. No. 4,467,011, there was disclosed a method for improving the melt flow of amide-imide polymers by blending the resins with amorphous polyamides. These amorphous polyamides were also shown to be useful as sizing compositions for use with glass fibers, chopped fiber fillers, and various reinforcing fabrics in forming reinforced and filled polyamide-imide resins. Although these filled compositions have good processability and are readily injection-molded, thick-walled sections and structures having thick cross-sections exhibit a tendency toward cracking and void formation which severly limits the possible applications for such compositions.

Accordingly, there is a need for fiber sizing agents having sufficient thermal stability to withstand amide-imide polymer processing temperatures, providing improved binding between the fiber and the amide-imide polymer matrix while avoiding or reducing the tendency toward forming voids, cracks and similar defects in the final composite.

SUMMARY OF THE INVENTION

Reinforcing fibers created with sizing compositions based on amide-imide polymers described herein exhibit good adhesion between the carbon fiber surface and the amide-imide polymer matrix resin when formed into a composite structure. These sizing compositions avoid or markedly reduce the problem of void formation during the preparation of amide-imide composite sizing agents. The resulting fiber-reinforced composites exhibit improved properties such as fracture toughness, interlaminar shear strength and transverse tensile strength.

DETAILED DESCRIPTION OF THE INVENTION

The sizing compositions useful in the practice of this invention comprise polyamide-amic acids and amide-imide polymers, as well as copolymers and mixtures thereof, herein collectively referred to as amide-imide polymers. Amide-imide polymers are obtained by reacting a polycarboxylic acid anhydride or a mixture of a polycarboxylic acid anhydride and a dicarboxylic acid anhydride and derivatives with one primary diamine or a mixture of primary diamines. Suitable polyamide-amic acids for use as sizing resins for reinforcing fibers comprise recurring polyamide-amic acid A units of:

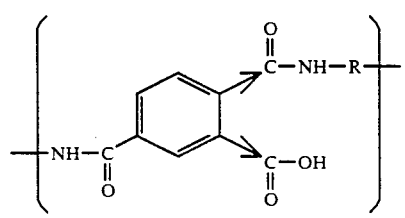

wherein → denotes isomerization and R may be a divalent, wholly or largely aromatic hydrocarbon radical of from about 6 to about 10 carbon atoms, or may comprise two divalent aromatic hydrocarbon radicals each of from 6 to about 10 carbon atoms joined directly or by stable linkages such as —O—, methylene, —CO—, —SO₂—, and —S—; for example, R—O—R—, —R—CH₂—R—, —R—CO—R—, —R—SO₂—R— and —R—S—R—. Additionally, R can be a mixture of two or more such radicals to provide a copolymer, terpolymer, etc.

These polyamide-amic acid units are capable of undergoing imidization ordinarily upon heating to produce polyamide-imides of the following recurring B units:

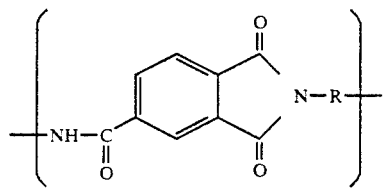

These materials have a weight average molecular weight from about 3,000 to about 13,000.

The amide-imide polymers are prepared from trimellitic anhydride and a mixture of wholly or partially aromatic primary diamines or fully or partially acylated diamines. The process using acylated diamines is disclosed in U.S. Pat. No. 4,309,528, incorporated herein by reference. Usefully, the trimellitic anhydride is an acyl halide derivative of the anhydride of trimellitic acid. Preferably, the anhydride is the acyl chloride derivative of trimellitic acid anhydride (4-TMAC).

Useful aromatic diamines include para- and meta-phenylenediamine, oxybis (aniline), thiobis (aniline), sulfonylbis (aniline), diaminobenzophenone, methylenebis (aniline), benzidine, 1,5-diaminonaphthalene, oxybis (2-methylaniline), thiobis (2-methylaniline), 2,2-bis[4-(p-aminophenoxy)phenyl] propane, bis[4-(p-aminophenoxy)phenyl] sulfone, 2,2-bis[4-(p-aminophenoxy)phenyl] hexafluoropropane, bis[4-(p-aminophenoxy)] benzene, bis[4-(3-aminophenoxy)] benzene, and the like. Examples of other useful aromatic primary diamines are set out in U.S. Pat. No. 3,494,890 (1970) and U.S. Pat. No. 4,016,140 (1977), both incorporated herein by reference. The preferred diamines are meta-phenylenediamine and oxybis (aniline).

Polyamide-imides and polyamide-amic acids useful in the practice of this invention may be prepared by reacting the acyl chloride derivative of trimellitic acid anhydride with at least one, preferably a mixture of two or more, largely or wholly aromatic primary diamines. The resulting products are polyamide-amic acids, predominantly A units. The A units contain free carboxylic acid groups which are capable of further reaction, particularly imidization, forming B units, and imidization may occur to some extent during polymer preparation. Typical polymers of this invention have up to about 50 percent imidization prior to heat treatment, typically about 10 to about 40 percent.

Preferably, the mixture of aromatic primary diamines is composed of meta-phenylenediamine, p,p′-oxybis(aniline) and meta-phenylenediamine, or p,p′-sulfonylbis-(aniline) and p,p′-methylenebis(aniline). More preferably, the mixture of primary aromatic diamines contains meta-phenylenediamine and p,p′-oxybis(aniline). Most preferably, the molar ratio of p,p′-oxybis(aniline) to meta-phenylenediamine is from about 50:50 to about 90:10. In the homopolymer system, the preferred diamines are oxybis(aniline) or meta-phenylenediamine. The aromatic nature of the diamines provides the excellent thermal properties of the homopolymers and copolymers while the primary amine groups permit the desired imide rings and amide linkages to be formed.

Also useful for coating the reinforcing fibers are copolymers of the foregoing amide-imide polymers comprising from about 20 to 80 percent of imide-containing moieties or C units having the following composition:

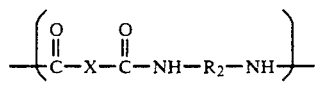

wherein R₂ is the same as R and X is a divalent aromatic radical. The preferred compositions are amide-imide phthalamide copolymers, wherein X is:

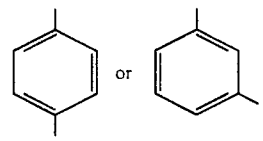

or a mixture of these.

Usually, the polymerization is carried out in the presence of a nitrogen-containing organic polar solvent, such as N-methylpyrrolidone, N,N-dimethylformamide and N,N-dimethylacetamide. The reaction should be carried out under substantially anhydrous conditions and at a temperature below about 150° C. Most advantageously, the reaction is carried out from about 20° C. to about 50° C.

The reaction time is not critical and depends primarily on the reaction temperature. It may vary from about 1 to about 24 hours, with about 2 to 4 hours at about 30° C. to about 50° C. preferred for the nitrogen-containing solvents.

Any fiber material that has a modulus of 8,000,000 psi or greater and is thermally stable to at least 600° F. for at least 10 minutes can be advantageously used with the sizing of the present invention. The term "thermally stable" means the fiber does not emit sufficient volatiles to cause voids in the final composite structure. Such thermally stable fiber materials as glass fiber, alumina, silica nitride, silicon carbide, boron, Kevlar fiber, graphite, or carbon fiber are useful. Carbon fibers are especially preferred.

The term "carbon fiber" is used herein in the generic sense and includes graphite fibers as well as amorphous carbon fibers which result after a thermal carbonization or graphitization treatment. Graphite fibers are defined herein to consist substantially of carbon and have a predominant X-ray diffraction pattern characteristic of graphite. Amorphous carbon fibers, on the other hand, are defined as fibers in which the bulk of the fiber weight can be attributed to carbon and which exhibit a predominantly amorphous X-ray diffraction pattern. Graphite fibers generally have a higher Young's modulus than do amorphous carbon fibers and in addition are more highly electrically and thermally conductive.

Carbon fibers which typically are employed in preparing the composites described herein contain at least about 90 percent carbon by weight. In a preferred embodiment, the carbon fibers contain at least about 95 percent carbon by weight and exhibit a predominantly graphitic X-ray diffraction pattern.

Reinforcing fibers are generally employed in the configuration of a ribbon or tape which may comprise a single flat tow of continuous carbon filaments or a plurality of substantially parallel multifilament fiber bundles which are substantially coextensive with the length of the ribbon.

In the latter embodiment, the fiber bundles of the ribbon may be provided in a variety of physical configurations. For instance, the bundles of the ribbon may assume the configuration of continuous lengths of multifilament yards, tows, strands, cables, or similar fibrous assemblages. The multifilament bundles are preferably lengths of a continuous multifilament yarn. The fiber bundles within the ribbon optionally may be provided with a twist which tends to improve their handling characteristics. For instance, a twist of about 0.1 to 5 tpi, and preferably about 0.3 to 1.0 tpi, may be imparted to each fiber bundle. Also, a false twist may be used instead of or in addition to a real twist. Alternatively, the fiber bundles may possess substantially no twist.

Multifilament fiber bundles may be provided within the ribbon in a substantially parallel manner in the substantial absence of bundle crossovers to produce a flat ribbon. The number of parallel multifilament bundles present within, for example, the carbon fiber ribbon may be varied widely, e.g., from 6 to 1,000 or more. In one embodiment, a ribbon is selected having a weft pick interlaced with substantially parallel fiber bundles in accordance with the teachings of commonly assigned U.S. Pat. No. 3,818,082, which is herein incorporated by reference. It is not essential, however, that the parallel fiber bundles or the filaments of a flat tow be bound by any form of weft interlacement when constructing fiber tapes for resin impregnation in accordance with the procedures described herein.

The sizing agent can be applied to individual fibers or to multiple fibers in the form of bundles, ribbons, tapes or fabrics, and the like. The sizing compositions can be applied to the fibers by known methods, for example, by drawing the fibers through a bath containing the molten size or the size in solution or by spraying the size onto the fibers and then drying the fibers to remove substantially all the solvent. A suitable apparatus for coating the carbon fibers with the sizing agent is illustrated in U.S. Pat. No. 3,914,504, which is incorporated herein by reference.

It is preferred that the sizing agent be applied by passing the fiber through a bath containing a solution of the agent in a suitable solvent. This method allows the amount of size coated onto the fiber to be readily controlled. The presence of solvent will improve the ability of the sizing agent to penetrate into the individual fibers of a staple yarn, filament yarn, tape, fabric or roving. The concentration of the size in the solvent is usually in the range of from about 0.05 to about 10 percent, and preferably from about 0.5 to about 5 percent by weight, based on the total weight of the solution.

The solvent used should be capable of dissolving sufficient quantities of the sizing agent to allow efficient coating of the fiber and also be nonreactive with the sizing agent. Examples of suitable solvents are N-methylpyrrolidone (NMP), N,N-dimethylformamide (DMF), methyl ethyl ketone (MEK), and N,N-dimethylacetamide (DMAC). Other materials to aid in the removal of the solvent, such as methylene chloride, can be added to the solvent.

The amount of sizing agent on the fiber will depend on the configuration of the fiber during application, i.e., whether the fiber is in the form of a bundle, fabric or the like. For a continuous fiber or filament, the amount of sizing agent or coating will ordinarily range from about 0.05 to about 1.5 percent by weight based on the fiber. For a unitape (number of fibers parallel to one another), the amount of sizing agent or coating will ordinarily range from about 0.05 to about 1 percent by weight based on the unitape. For a chopped or staple fiber, the amount of sizing agent or coating will ordinarily be less than about 6 percent by weight based on the fiber. A treated fabric will ordinarily contain an amount of sizing agent or coating from about 0.2 to about 1.8 percent by weight based on the fabric.

Typically, a fiber strand or ribbon is passed into a solution containing the sizing agent and then into a heated tube to remove the solvent and dry the fiber. The tube is heated by hot air. Continuous fiber for woven fabric must be sized for the weaving process. Commercial products are most often available with size materials, which are not compatible with amide-imide polymer matrix resins. For example, carbon fiber commonly is sized with an epoxy size material. One commercial product is available with a polyimide (PI) size which is also not compatible with amide-imide polymer matrix resins. Both the epoxy and the PI size materials emit volatiles at process temperatures as high as 700° F. which are used for amide-imide polymer matrix resins.

Solvent wash and heat-cleaning can be used, for example, for removal of epoxy and polyimide size from carbon fiber woven fabrics, and laminate properties are significantly improved after the size material is removed. Optimum properties, however, have been achieved by using unsized carbon fiber, applying an amide-imide polymer, weaving the sized fiber into a fabric, and impregnating the resulting fabric with amide-imide polymer matrix resins to form a prepreg for molding.

The sized individual fibers or multiple fibers can be woven into fabric using a loom, twisted to form yarns, chopped into staple fibers and the like. When woven into fabrics the fibers can be combined with other materials, such as glass fiber, to form unidirectional fabric.

The fibers coated with sizing agent described herein are primarily intended to be used in fiber reinforced composite structures. The term "composite structure" refers to a heterogeneous assembly comprised of two or more components, at least one of which defines a continuous phase which is hereinafter designated as the "matrix" component, and at least one other component defining reinforcing means or reinforcement for the said composite assembly, the reinforcing means being contiguous to and firmly bonded to the matrix component. For example, the respective components of such composite assemblies can be either coated, layered, stratified and/or laminated and the like.

Thus, the composite structures of the present invention comprise the amide-imide polymer matrix component, and the reinforcing material which comprises reinforcing fibers and the sizing agent described herein for the fibers.

The composite-fabrication technique may be selected from any of those procedures previously employed in the advanced engineering composite art. Typically, a composite structure is formed by impregnating individual lamina (e.g., fiber layers, ribbons, plies, etc.) of sized fibers arranged in the desired configuration with the amide-imide polymer to form a prepreg. The impregnation of the lamina may be conducted by applying the amide-imide polymer to the same from a melt or preferably from a solution. The dry-impregnated lamina are then stacked as needed and molded with conventional molding techniques.

The composite structures will generally constitute from about 50 to about 70%, and preferably from about 55 to about 65%, by weight, sized fibers and correspondingly from about 50 to about 30%, and preferably from about 45 to about 35%, by weight, amide-imide polymer matrix based on the weight of the composite.

These composite structures find utility in the military aircraft industry where the composite structures must have good toughness and be able to withstand extended use at temperatures in excess of 350° F. in a humid atmosphere. Additional less demanding applications are found in commercial aircraft and automotive industries.

The invention will be better understood by considering the following examples. It will be understood that the examples are for illustrative purposes only and do not purport to be wholly definitive with respect to the conditions or scope of the invention.

EXAMPLE 1

A 200-ml, round-bottom, 4-neck flask, equipped with a nitrogen inlet tube, stirrer, thermometer, and solids addition funnel, was charged with 99.9 parts by weight (pbw) of p,p'-oxybis(aniline) (OBA), 23.1 pbw metaphenylenediamine (MPDA) and 604 pbw N-methylpyrrolidone (NMP). When solution at room temperature (72° F.) was complete, 141.75 pbw 4-trimellitoyl anhydride chloride (4-TMAC), having a purity of 99.5 percent ±0.5 percent as determined from chloride content and 7.5 pbw of trimellitic acid anhydride (TMA) were added over 2.5 hours while maintaining a solution temperature of between 77°-95° F. When addition was complete, the solution was stirred for 3 hours during which time the solution viscosity increased to a Gardner-Holdt value of Z5+ or about 110 poises.

Solid polymer was obtained by first pouring the viscous solution into twice its volume of distilled water in a Waring blender and then filtering. The filtrate was washed with 5 increments each of 3000 pbw of distilled water to remove hydrogen chloride that had been generated during reaction.

The solid was dried under a vacuum of 20 inches of mercury for 24 hours at 122° F. A 2-gram sample heated for 20 min. at 500° F. in an air-circulating oven showed a volatiles content of 10%.

EXAMPLE 2

A 200-ml, round-bottom, 4-neck flask, equipped with a nitrogen inlet tube, stirrer, thermometer, and solids addition funnel, were charged with 99.9 parts by weight (pbw) of OBA, 23.1 pbw of MPDA and 604 pbw of NMP. When solution at room temperature (72° F.) was complete, 144.0 pbw 4-TMAC, having a purity of 99.5 percent ±0.5 percent as determined from chloride content and 5.5 pbw of TMA were added over 2.5 hours while maintaining a solution temperature of between 77°-95° F. When addition was complete, the solution was stirred for 3 hours during which time the solution viscosity increased to a Gardner-Holdt value of Z5+ or about 110 poises.

Solid polymer was obtained by first pouring the viscous solution into twice its volume of distilled water in a Waring blender and then filtering. The filtrate was washed with 5 increments each of 3000 pbw of distilled water to remove hydrogen chloride that had been generated during reaction.

The solid was dried under a vacuum of 20 inches of mercury for 24 hours at 122° F. A 2-gram sample heated for 20 min. at 500° F. in an air-circulating oven showed a volatiles content of 10%.

A 2000-ml, round-bottom, 4-neck flask, equipped with a nitrogen inlet tube, stirrer, thermometer, and solids addition funnel was charged with 1000 pbw of NMP. After bringing the flask contents to 50°-60° C., 598 pbw of the solid prepared were added with stirring. Solution was effected after stirring for 2-3 hrs at 50°-60° C. After cooling to 25° C., the viscosity was 158 poises with a determined solids content of 37.8% (Sample of 2 g heated for 2 hrs at 200° C.).

EXAMPLE 3

A sample of polymer as prepared by the method of Example 1 was heated for 2 hours in an oven dryer with a temperature range of 375°-450° F.

EXAMPLE 4

A 690-gram portion of dimethylacetamide was stirred and cooled to 5° C. with dry nitrogen purging to keep the system dry. An intimate mixture composed of 252.2 grams of 4-TMAC, 119.0 grams of p',p-methylene-bis-(aniline), and 120.0 grams of p,p'-oxybis(aniline) was then added to the solvent over a period of 30 minutes. The temperature of the reaction was allowed to rise to 50° C. At that temperature it was controlled by means of an ice bath. An additional 100 grams of DMAC were then added to wash in all solids and the reaction continued for another 3½ hours at 50° C. The reaction solution was then poured into a large excess of rapidly agitated water, whereupon precipitation of the copolymer took place. The solids were then washed several times with distilled water and soaked overnight. Finally, the solids were dried at 120° F. A 443-gram yield of the copolymer was obtained.

EXAMPLE 5

A solution consisting of 533.3 grams of NMP, 300 grams of DMAC, and 58.0 grams of propylene oxide was stirred and cooled to 8° C. A mixture of 168.5 grams of 4-TMAC, 80.1 grams of OBA, and 79.3 grams of MBA was then added to the solvent over a period of 50 minutes. During this time the reaction was allowed to warm to 36° C. An additional 66.7 grams of NMP were added to wash in all solids, then the reaction mixture was heated to 50° C. and held at that temperature for 3½ hours. The solution was then filtered.

EXAMPLE 6

The general procedure for preparing a copolymer containing three diamines is illustrated by the reaction of OBA, MPDA and MBA and 4-TMAC in DMAC. Thus, a 242.0-gram portion of OBA (1.21 moles), a 130.7-gram portion of MPDA (1.21 moles) and a 239.6-gram portion of MBA (1.21 moles) were dissolved in 3900 grams DMAC contained in a 6-liter flask equipped with a nitrogen purge, stirrer, addition funnel and thermometer. A 765-gram portion of 4-TMAC (3.63 moles) in flake or lump form was then added to the solution in portions over 90 minutes. The reaction exotherm was allowed to raise the temperature to about 35° C. The reaction temperature was maintained at 33°–38° C. for the remainder of the 4-TMAC addition using cooling water when necessary. After the 4-TMAC addition was completed, any residual 4-TMAC clinging to the addition funnel was completely washed into the reaction solution with 70 grams DMAC. A heating mantle was applied to the reaction flask and the temperature quickly raised (about 20 min.) to 50° C. The reaction solution was stirred at 50° C. for 90 minutes and then the solution was precipitated by admixing with water. Prior to precipitation, the solution viscosity was about 7.5 stokes (25° C., 20 percent solids). The polymer was precipitated in distilled water in a model D, W. J. Fitzpatrick Company, comminuting machine (Fitz mill). After precipitation, the polymer was washed with distilled water to aqueous pH 4 to 5 (3 to 4 hours washing time), then filtered onto large Buchner funnels. The polymer was dried overnight by drawing air through the funnels, then finally dried in an aeromat drier at 30°–35° C. for 12–15 hours.

EXAMPLE 7

Amide-imide Phthalamide Copolymer

A 2000 gal., glass-lined Pfaudler kettle equipped with a water-cooled jacket and nitrogen inlet was charged with 855 lbs. of MPDA, 11.7 lbs. of phthalic anhydride and 5126 lbs. of NMP. After solution had occurred under a nitrogen purge, an intimate blend of 816 lbs. of 4-TMAC and 803 lbs. of isophthaloyl dichloride (IPCL$_2$) was added over 4 hrs. keeping the temperature below 35° C. The resulting viscous solution was brought to 50° C. When the Gardner viscosity had reached a Zl viscosity, the solution was precipitated by passage through a Fitzpatrick comminuting mill. The polymer product was washed nine times with deionized water. The product was then brought to a solids content of >98% by heating in a forced air dryer for 2 hrs. at 450° F.

EXAMPLE 8

Amide-amic Phthalamide Copolymer Solution

A round-bottom, 2000-ml, 4-neck flask was charged with 1045 g dry NMP, 162.1 g of MPDA, and 4.3 g of TMA. The flask was equipped with a mechanical stirrer, nitrogen inlet tube, thermometer, and a liquid addition funnel. During solution of the diamine and TMA, the addition funnel was charged with 248.0 g of 4-TMAC and 60.9 g of IPCL$_2$ and melted at 80° C. When melting was complete, the solution of acid chlorides was added to the diamine/TMA solution over a 2-hour period at 25°–35° C. After addition was complete, the viscous solution was heated to 50° C. and held for 1 hour.

EXAMPLE 9

Continuous carbon fiber prepreg in a polyamide-amic acid matrix was prepared where the polymer was prepared according to Example 1.

Laminates of polyamide-amic acid solution-impregnated graphite fiber woven fabric have been produced at lower molding pressures when only polyamide-amic acid is used compared to polyamide-imide impregnated fabric.

The solution was used to coat 26"×42" pieces of graphite fiber woven fabric. The fabric was woven from Thornel 300 fiber (Union Carbide Corporation) into an 8 harness satin weave weighing 370 g/m$^2$. Both solution and fabric were preweighed to yield 39 percent dry resin content coated fabric after solvent extraction. The fabric was taped to polyethylene film and the solution was worked into the fabric with a propylene squeegee. The coated fabric was dried at ambient temperature until tack-free, then stripped from the polyethylene backing and oven dried at 300° F. for 16 hrs. After drying, the fabric was cut to the desired dimensions and loaded in a mold preheated to 650° F. The mold was partially closed on 0.250-inch shims for 5 minutes to allow additional devolatilization while the material and the mold were heated to the 650° F. mold temperature. Full pressure was applied for 5 minutes followed by a double bump (partial opening of mold) to allow venting of entrapped volatile matter. The laminates were then cooled to 350° F. for demolding.

Polyamide-amic acid is the intermediate product obtained in the amide-imide manufacturing process prior to the imidization step. Evaluation of polyamide-amic acid prepared according to Example 1 in NMP solution indicates desirable characteristics when used as an impregnating resin for carbon fabrics. With the heat history provided by the drying and the molding processes, however, amic acid matrix resin is converted to amide-imide polymer. Laminates prepared with the solution have good laminate properties. The intermediate product prepared as shown in Example 1 has approximately one-tenth of the polyamide-imide solution viscosities which permits the use of higher concentrations in the impregnation solution. Higher concentrations result in better distribution of polymer in the fiber strand. Higher concentrations also minimize shrinkage and other problems associated with eliminating the NMP solvent in drying.

Laminates are fabricated by stacking layers of dry impregnated fabric in a hot platen press. As compared to polyamide-imide solution laminates, polyamide-amic acid solution matrix has proven to have lower apparent melt viscosity as evidenced by improved resin fill on the laminate surface, increased squeeze out on unsupported edges and improved laminate quality at molding pressures as low as 150 psi. The reduced melt viscosity is a result of having reduced molecular weight in the polymer.

The glass transition temperature (Tg) of the powders of the polyamide-amic acid from Example 1 and the imidized product therefrom were determined by differential scanning calorimetry (DSC) at 469° F. and 485° F., respectively. Laminates were molded from fabrics impregnated with solutions of both powders. The laminates were cut into short beam shear bars and the bars were pulled after each stage of the post cure to monitor the increase in Tg and shear strength. The results shown in Table 1 indicate that the increase in Tg for the amic acid material does lag behind that of the fully imidized amide-imide material initially, but at the end of the seven-day cure the two materials have similar glass transition temperatures. The results also indicate that the shear strength of the amic acid laminate was greater than that of the fully imidized amide-imide polymer laminate throughout. This unexpected superiority in strength has been observed in other experiments.

Polyamide-amic acid has distinct processability and property advantages over the fully cured amide-imide polymer when used as a matrix material in continuous fiber composites. The flexural modulus and flexural strength values were determined by the ASTM D-790 test procedure. The short beam shear (SBS) value was determined by the ASTM D-2344 test procedure.

TABLE I

EFFECT OF POST CURE ON GLASS TRANSITION TEMPERATURE, RESIDUAL NMP LEVEL AND SHEAR STRENGTH OF GRAPHITE[1]/POLYAMIDE-IMIDE LAMINATES

| Cumul. Days in Cure | Cure Temp. (°F.) | Amic Acid Prepared As Shown in Example 1 | | | Fully Cured Amide-Imide Polymer As Shown in Example 1 | | |
|---|---|---|---|---|---|---|---|
| | | Tg (°F.) | NMP (%) | SBS (psi) | Tg (°F.) | NMP (%) | SBS (psi) |
| 1 | 300 | — | — | — | — | — | — |
| 2 | 400 | 482 | 0.39 | $11.3 \times 10^3$ | 486 | 0.29 | $10.9 \times 10^3$ |
| 3 | 430 | 477 | 0.30 | $12.8 \times 10^3$ | 487 | 0.20 | $11.5 \times 10^3$ |
| 4 | 460 | 496 | 0.41 | $13.5 \times 10^3$ | 495 | 0.19 | $12.0 \times 10^3$ |
| 5 | 490 | 496 | 0.41 | $14.4 \times 10^3$ | 507 | 0.26 | $12.8 \times 10^3$ |
| 6 | 500 | 507 | 0.37 | $14.8 \times 10^3$ | 509 | 0.27 | $12.7 \times 10^3$ |
| 7 | 500 | 522 | 0.31 | $13.0 \times 10^3$ | 520 | 0.27 | $12.2 \times 10^3$ |

[1]Fabric: Celion 3000/515-4HS Weave (Celanese Corporation)

EXAMPLE 10

We have demonstrated the use of amide-imide as a size on reinforcement fiber for engineering polymers. Chopped carbon fiber with AI size has been successfully processed in injection molding compounds, and continuous carbon fiber with AI size has been successfully woven and processed into fabric reinforced laminates. AI varnish is a good film former and it has good adhesion strength to carbon fiber.

Continuous carbon fiber for woven fabric laminates must be sized for the weaving process. Commercial products are most often available with epoxy size materials which are not compatible with AI matrix resins.

One commercial product is available with polyimide (PI) size which is also not compatible with AI matrix resin. Both the epoxy and the PI size materials emit volatiles at process temperatures used for AI matrix materials.

Solvent wash and heat-cleaning techniques have been developed for removal of epoxy and PI size from woven fabrics, and laminate properties are significantly improved after the size material is removed. Optimum properties, however, have been achieved by purchasing unsized fiber, applying AI size with a dilute AI varnish, weaving the sized fiber into a fabric, and impregnating the resulting fabric with AI matrix resin to form a prepreg for molding.

TABLE 2

AMIDE-IMIDE FABRIC[1] LAMINATE PROPERTIES

| | | Room Temperature | |
|---|---|---|---|
| Panels | No. of Specimens | Flexural Strength psi | Flexural Modulus psi |
| 81-01-12-01 Unsized | 3 | 93,100 | $7.37 \times 10^6$ |
| 81-01-14-01 Sized with 0.5% Solution of Amide-imide | 2 | 101,600 | $7.86 \times 10^6$ |

| | | 400° F. | |
|---|---|---|---|
| Panels | | Flexural Strength psi | Flexural Modulus psi |
| 81-01-12-01 Unsized | 3 | 75,600 | $7.47 \times 10^6$ |
| 81-01-14-01 Sized with 0.5% Solution of Amide-imide | 2 | 77,400 | $7.90 \times 10^6$ |

[1]8-harness satin T-300 fabric, 24 × 24 style

EXAMPLE 11

Continuous Fiber Composite

Woven graphite fabric was purchased from Hexcel Corporation and washed with NMP solvent to remove the commercial epoxy fiber size. The fabric was an 8HS weave with Thornel T 300/309 fiber. One fabric sample was sized by spraying with 0.5% AI solids in a 50/50 blend of methyl ethyl ketone (MEK) and NMP solvents. That sample and a second one without size were hand impregnated with AI 335 amide-imide varnish from Amoco Chemicals Company. After drying, the impregnated fabric was molded into laminates. The test results shown in Table 2 indicate a significant increase in properties as a result of presizing the fabric with dilute AI solution.

Magnamite AS4 high strain carbon fiber strand (12K) (Hercules Corporation) was sized with a dilute solution of AI 335 to 1% dry resin content. The AI varnish diluted with NMP solvent was observed to wet and coat the carbon fiber very well. After sizing, the strand was impregnated in a heated resin bath with modified AI 335 varnish and drum wound to form unidirectional (U.D.) broadgoods. Handleability of the fiber strand was much improved after sizing. Also, the desired dry resin content of 35% on the U.D. tape was achieved whereas previous attempts to impregnate strand without size had resulted in resin contents ranging from 38 to 48%. Unidirectional laminates were molded from the broadgoods and compression tested. Laminates which were identical, except for the use of unsized fiber, were also tested. The test results shown below clearly demonstrate significant improvement in properties as a result of using an AI fiber size.

| | No Fiber Size | AI Fiber Size |
|---|---|---|
| Compression Strength, psi | | |
| Room Temperature | $154 \times 10^3$ | $203 \times 10^3$ |
| 200° F. test temperature after conditioning in 160° F. H$_2$O for 2 weeks | $104 \times 10^3$ | $143 \times 10^3$ |

Unsized Celion 3000-3K carbon fiber strand (Celanese Corporation) was purchased and sized by using a dilute solution of amide-imide polymer powder prepared as shown in Example 1. The sizing solution consisted of NMP solvent and 1% amide-imide polymer solids. After sizing, the fiber was subjected to weaving trials. The fiber proved to have good processability in the weaving process and both 4-harness satin (crowfoot) and 8-harness satin fabrics were fabricated. The fabric was impregnated using hand coating techniques. The impregnation material was dry amide-imide powder prepared as shown in Example 1. After drying, the preimpregnated fabric was molded into laminates for test and evaluation.

Identical laminates were prepared from commercial fabrics with the exception that the commercial material was heat-cleaned prior to impregnation to remove the fiber size. A comparison of test results for the two materials is shown below.

|  | Heat-Cleaned | AI Size |
| --- | --- | --- |
| Short Beam Shear Strength, psi | $9.7 \times 10^3$ | $13.0 \times 10^3$ |
| Flex. Strength, psi | $140.3 \times 10^3$ | $151.6 \times 10^3$ |
| Flex. Modulus, psi | $8.3 \times 10^6$ | $8.5 \times 10^6$ |

Laminates of both types have been tested in compression as supplied and after impacting 4"×6" panels with a ⅝" radius top at various energy levels. The use of AI fiber size had a dramatic effect on the compressive failure as shown below.

|  | Heat-Cleaned | AI Size |
| --- | --- | --- |
| Compressive Failure Strain (%) Preimpact |  |  |
| None | 0.61 | 1.07 |
| 1000 in/lb | 0.59 | 0.96 |
| 2000 in/lb | — | 0.83 |

EXAMPLE 12

Woven silicon carbide fabric identified as Dow Corning Nicalon Silicon Carbide 8 Harness Satin was washed in acetone solvent to remove the epoxy size. The fabric was impregnated with a solution of polyamide-imide resin from Example 1. The resin was dissolved in NMP to give a solution with a resin content of 30 weight percent. Both the solution and the fabric were preweighed to yield a 30% dry resin coated fabric after solvent extraction. The fabric was taped to a polyethylene film and the polyamide-imide solution was washed into the fabric with a polypropylene squeegee. The coated fabric was dried in a forced air oven for 4 days at room temperature, 2 hours at 250° F., 1 hour at 300° F., and 1 hour at 400° F. to lower the solvent content to about 1.5 wt. %. The fabric was cut to the desired dimensions with successive plies oriented 90° to each other. The plies were tacked together at two corners using a Seelye plastic welder with a tacking tip. The lay-up of four plies was placed in a vacuum bag autoclave to be molded. The vacuum bag autoclave had a 1 hour heatup time at full vacuum, a 15-minute dwell time at 660° F., a 15-minute time at 500 psig and 600° F., and was cooled at 500 psig to 300° F. at the maximum rate. The thickness of the laminate ranged from 0.045 to 0.048 inch with the laminate surface fairly uniform with a dark color, slightly semiglossy and dry looking with fill fiber showing.

EXAMPLE 13

N-methyl-2-pyrrolidone (NMP) is a solvent for polyamide-imide polymer of Example 2 and Trogamid-T an amorphous polyamide obtained from the Dynamit-Nobel Company. A 27.5 percent solids solution of Trogamid-T in NMP was prepared as follows. The NMP (725 grams) was heated to 180° F., and stirred with a high shear blade mixer with sufficient speed to keep the Trogamid-T pellets from agglomerating when added to the solvent. The Trogamid-T pellets were added to the hot solvent over a 20-minute period. After about 1½ hours mixing, all pellets were dissolved. Mixing was continued for 2 hours after all pellets appeared to be dissolved. The solution was allowed to cool and sit 16 hours before using.

The Trogamid-T solution described above was blended with a polyamide-imide/NMP solution (27.5 percent solids) at a 95:5 weight ratio. The polyamide-imide solution was first heated to 150° F. The Trogamid solution was thus added, and the blend was stirred with a high shear mixer for 4 hours. The blended solution was allowed to cool and sit 16 hours before using.

The blended solution of polyamide-imide/Trogamid-T was used to coat carbon fiber unidirectional tape. The impregnated unitape was used to form a laminate.

EXAMPLE 14

Continuous carbon fiber identified as Celion 3000 manufactured by Celanese was sized with a polyamide-imide as prepared in Example 3. The amide-amide polymer of Example 3 was dissolved in NMP at room temperature to a 1% solids level. The solution was placed in an immersion bath kept at room temperature and the continuous carbon fiber was passed through the solution. The sized carbon fiber was passed through a heated air chamber with the air temperature maintained at 200° to 300° F. with the resultant dried carbon fiber sized with a level of 1% amide-imide polymer on the carbon fiber.

Chopped Fiber Composites using Amide-Imide Phthalamide Copolymer Sizing

EXAMPLE 15

Hercules AS4-12k Magnamite PAN carbon fiber was sized with a NMP solution containing 5.5% by weight of polyamide-imide phthalamide (PAIP) as prepared in Example 7. The coating was accomplished by dipping the fiber in a bath containing a solution of NMP and polyamide-imide phthalamide and then drying the fiber to remove the solvent. The polyamide-imide phthalamide varnish was observed to wet and coat the carbon fiber very well, allowing the fiber to be handled without fraying or bundling.

The chopped PAIP coated fiber was then dried in a desiccant oven at 275° F. for approximately 16 hrs and then 30 weight % of the fiber was blended with 69 pbw of Torlon 4000T amide-imide molding resin from Amoco Chemicals Company and 1 pbw of PTFE and the master batch was fed to a Werner-Pfleider ZSK-30 twin screw extruder. The material was melt homogenized and then pelletized.

EXAMPLE 16

Hercules AS4-12k Magnamite PAN carbon fiber was sized with a NMP solution containg 2% by weight of PAIP as prepared in Example 7. The coating process was similar to that described in Example 15. The dried fiber was then strand fed into the Werner-Pfleiderer vent port and the fiber was chopped, conveyed, and mixed with 69 pbw of Torlon 4000T molding resin and 1 pbw of PTFE by the rotation of the screw.

EXAMPLE 17

Samples as prepared in Examples 15 and 16 were injection molded, using 10 oz Stokes and 16 oz New Britain molding machines, to form ASTM test specimens, 4 in. by 0.5 in. discs and 3.5 in. by 0.43 in. discs. The molding and curing conditions used were substantially those disclosed in U.S. Pat. No. 4,467,011. After curing, each example was X-rayed using a Hewlett Packard 43805N Faxitron Series machine to determine the integral part integrity with the main emphasis on detecting internal cracks. Those parts that cracked were rejected.

The cured discs of Example 15 were smooth and remained crack-free, with 88% of the 4-in. disc specimens and 100% of the 3.5-in. discs rated acceptable. The cured 4-in. discs of Example 16 were smooth and remained crack-free, with 90% of the parts acceptable. Numerous molding studies with reduced levels of the PAIP size gave significantly higher molding yields than with the comparative compositions.

Chopped Fiber Composite

The following control samples were compounded and injection molded: Control A used unsized carbon fiber (Hercules AS4-12k), Control B used polyethersulfone sized carbon fiber (Hysol Grafil XA-s/PES/6), Control C used polysulfone sized carbon fiber (Hercules AS 1810/AS), and Control D used Hercules AS4-12k carbon fibers sized with AI 335 similar to that described in Example 11. All of the fibers have essentially the same properties with tensile strength in the 335 to 360 Ksi range and elongations of 1.2 to 1.3%.

Moldings of 4-in. discs of Controls B and C exhibited 100% failure rates due to severe cracking. Discs made with the AI 335 amide-imide sized fibers, Control D, behaved erratically in multiple molding trials, with failure rates ranging from 100% to 20% due to crack formation. Control A, prepared from unsized carbon fiber, gave a 33% failure rate. Control A was extremely difficult to compound and injection mold due to fiber bundling and fraying, a common occurrence when handling unsized carbon fiber.

Additional comparative examples were prepared from Amoco Chemicals Torlon 9000T amide-imide phthalamide copolymer alloyed with 20 pbw of Ultem 1000 (polyetherimide from General Electric) and Victrex 600 P (Polyethersulfone from Imperial Chemical Industry). Sixty-nine pbw of these amide-imide phthalamide alloys were blended with 30 pbw of Hercules AS1810 polysulfone sized carbon fiber and 1 pbw of PTFE and then compounded and molded as described in Examples 15 and 17. Discs with cross sections of 0.5 in. were molded; all of the parts had large surface cracks. Injection-molded discs prepared from these alloys with amide-imide sized fibers and with unsized fibers also gave only cracked specimens. Scanning Electron Microscopy analysis of the tensile fracture surfaces for these moldings demonstrate that much less fiber adhesion occurs with the PAIP sized carbon fibers (Examples 15 and 16 materials) than with the comparative example materials. Qualitatively, reducing the adhesion at the fiber/polymer interface appears to reduce the degree of cracking, at least in thick-section injection-molded parts.

It will be apparent that the sized fibers of this invention are also useful in preparing injection-molded composites filled with chopped sized fiber. The differences between various combinations of matrix resins with sized fibers are generally small for laminates and composites formed from sized, continuous fiber, and are largely seen in reduced flexural strengths and lessened mechanical property translation. The differences become much more apparent when injection molding thick-section parts using matrix resins filled with chopped sized fiber. Surprisingly, the amide-imide phthalamide copolymers such as that of Example 7 are more effective as sizing agents for this purpose, in that thick-wall parts are produced from filled amide-imide resins without significant void formation and cracking problems. Most thermoplastic resin-sized carbon fiber fillers, as shown by Control Examples A-H, caused severe cracking problems when used in molding thick ($>0.250''$) sections, whether using amide-imide or amide-imide phthalamide polymers as the matrix component. Cracking problems do not generally occur when molding much thinner ($<0.125''$) sections.

It will thus be quite apparent that the behavior of alternative combinations of fiber sizing and matrix resin in various end-uses and applications cannot be predicted from any consideration of their structural similarities. Even when the matrix resin and sizing are structurally identical, as in the Control D example, substantial molding problems can occur. Conversely, the sizing and matrix resin combinations used in Control D, when used with continuous fiber and with fabrics, give composites having excellent mechanical properties, as shown in Examples 9–11.

This invention will thus be seen to be reinforcing fibers, and preferably carbon-reinforcing fibers, sized or coated with an amide-imide polymer or an amide-imide phthalamide copolymer comprising from 20 to 80 mole % recurring amide units, identified hereinabove as C units. The coated fiber will comprise from 0.1 to 10 percent by weight, on a dry basis, of the sizing composition. The sized fibers may be used to form composites with amide-imide polymer matrix resins, these composites comprising from about 30 to about 90 wt. % amide-imide matrix polymer component and from about 10 to about 70 wt. % sized reinforcing fiber.

What is claimed is:

1. A sized fiber suitable as a reinforcement in a composite comprising fibers and an amide-imide polymer matrix resin, said sized fiber consisting of a thermally stable fiber having coated on the surface thereof from about 0.1 to about 5 percent by weight, based on weight of the fiber, of a sizing composition consisting of an amide-imide phthalamide copolymer.

2. The sized fiber of claim 1 wherein said amide-imide phthalamide copolymer comprises recurring A units of:

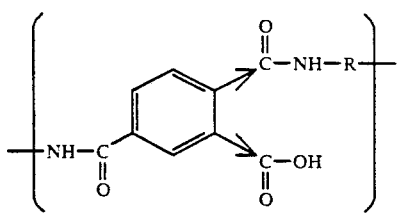

capable of undergoing imidization wherein → denotes isomerization, recurring B units of:

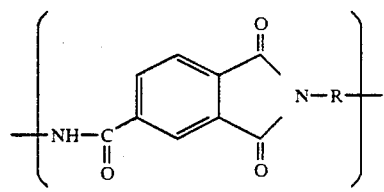

and recurring C units of:

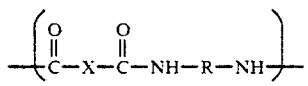

wherein R is an aromatic hydrocarbon moiety selected from the group consisting of divalent aromatic hydrocarbon radicals of from 6 to about 10 carbon atoms, 2 divalent aromatic hydrocarbon radicals of about 6 to about 10 carbon atoms joined directly or by stable linkages selected from the group consisting of —O—, methylene, —CO—, —SO$_2$— and —S— and mixtures thereof, and X is a divalent aromatic radical.

3. The sized fiber of claim 2 wherein R and X are independently selected from the group consisting of:

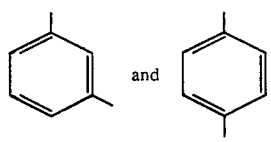

4. The sized fiber of claim 1 wherein said amide-imide phthalamide copolymer comprises from about 20 to about 80 mole % of C units.

5. The sized fiber of claim 1 wherein said thermally stable fiber is carbon fiber.

6. The sized fiber of claim 1 in the form of chopped fiber.

7. A carbon fiber having coated on the surface thereof from about 0.1 to about 5 percent by weight, based on weight of the fiber, of a sizing composition consisting of an amide-imide phthalamide copolymer having recurring A units of:

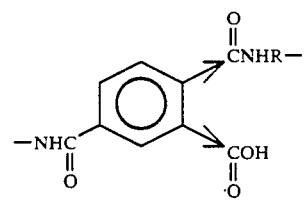

capable of undergoing imidization wherein → denotes isomerization;
recurring B units of:

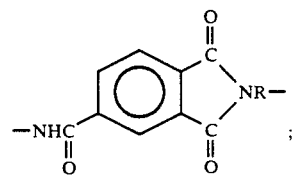

and from about 20 to about 80 mole % recurring C units of:

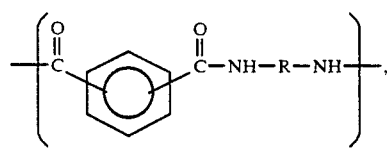

wherein R is an aromatic hydrocarbon moiety selected from the group consisting of divalent aromatic hydrocarbon radicals from 6 to about 10 carbon atoms, two divalent aromatic hydrocarbon radicals from 6 to about 10 carbon atoms joined directly or by stable linkages selected from the group consisting of —O—, methylene, —CO—, —SO$_2$— and —S—.

8. The carbon fiber of claim 7 wherein said recurring A units are:

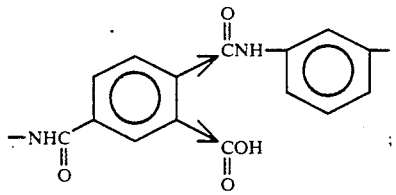

said recurring B units are:

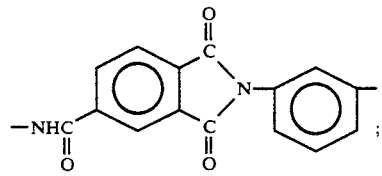

and said recurring C units are:

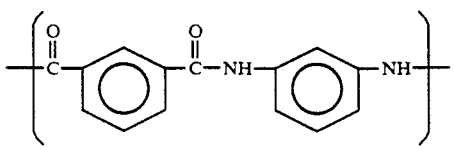

9. The carbon fiber of claim 7 in the form of chopped carbon fiber.

* * * * *